Patented Apr. 28, 1942

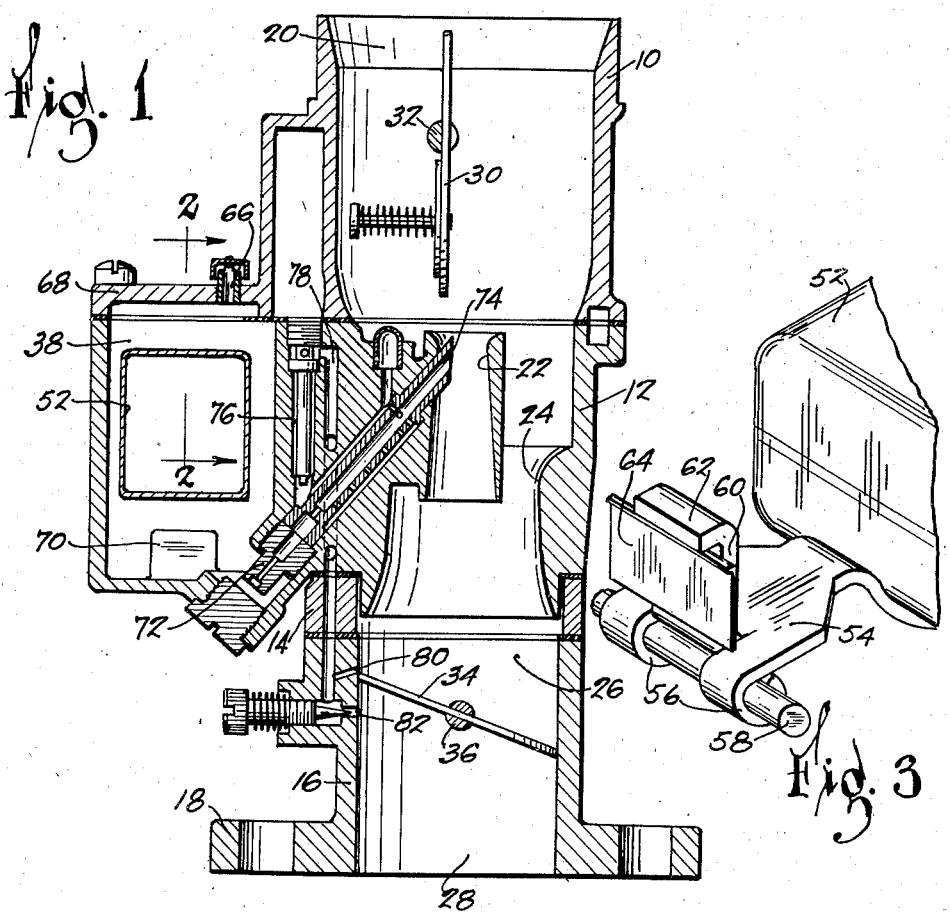
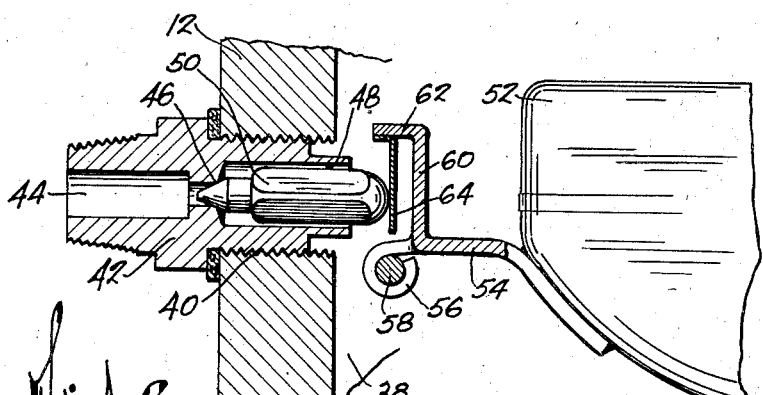

2,281,126

UNITED STATES PATENT OFFICE 2,281,126

FLOAT VALVE FOR CARBURETORS

Samuel R. Willits, South Bend, Ind., assignor to Bendix Aviation Corporation, South Bend, Ind., a corporation of Delaware Application November 29, 1939, Serial No. 306,616

2 Claims. (Cl. 137—104)

This invention relates to carburetors and more particularly to float mechanism for maintaining the fuel level in the carburetor at a predetermined level.

In previous carburetor constructions it has been conventional practice to attach the float to a pivotally mounted float hanger having an arm adapted to directly contact one end of the fuel inlet valve, urging it against the valve seat as the fuel reaches the desired level. In such constructions the float hanger has been of such rigid material and design that but a negligible hanger deflection is experienced under the forces resulting from float buoyancy, even though the float be entirely submerged.

It has been found that road shocks transmitted through the vehicle to the carburetor cause the float to oscillate in a vertical plane even though the fuel in the float chamber is at or above the normal level. Due to the rigid hanger the float cannot move beyond the closed valve position and as a consequence the oscillations will necessarily be restricted to float movement from a closed fuel inlet valve position to a partially open one. During the open-valve position of the oscillation cycle additional fuel is delivered to the float chamber by the fuel pump or gravity supply tank. If the engine consumes fuel at a rate at least equivalent to that entering the float chamber during such oscillations the level is maintained at the desired value; however, in vehicles with relatively small engines operating on rough highways the rate of fuel consumption may be less than that received through the inlet valve and under such conditions the level rises and may overflow from the float chamber vent.

It is an object of the invention to provide a float mechanism which will maintain a substantially constant carburetor fuel level even under conditions of severe vibration.

A further object is to provide a resilient connection between the carburetor inlet valve and float.

A further object of the invention is to utilize a flat spring attached to the float hanger and yieldingly engaging the fuel inlet valve.

A further object of the invention is to provide a float mechanism which will permit the float to oscillate in a vertical plane while urging the fuel inlet valve toward closed position.

Other objects and advantages of the invention will be readily apparent to one skilled in the art from the following description taken in connection with the drawing in which:

Figure 1 is an elevational view in section of a carburetor embodying the invention;

Figure 2 is an enlarged partial view in section taken on the line 2—2 of Figure 1; and Figure 3 is a perspective view showing a portion of the float together with the float hanger, leaf spring and float fulcrum pin.

With particular reference to Figure 1, there is shown a carburetor having an air horn section 10, a main body section 12, a spacer 14, and a throttle body section 16 having a flange 18 for attaching the carburetor to the intake manifold of the engine. The carburetor induction passage comprises an air inlet 20, primary venturi 22, secondary venturi 24, mixing chamber 26, and mixture outlet 28. The air inlet 20 is controlled by an offset choke valve 30 attached to a choke shaft 32 which is pivotally mounted in the air horn. The choke valve may be controlled manually or by known automatic means. A throttle valve 34 mounted on throttle shaft 36 controls the mixture outlet in the known manner.

A fuel chamber 38 is formed in the main body section and has a threaded aperture 40 in one of the side walls thereof adapted to receive a fuel inlet fitting 42, as shown in Figure 2. The inlet fitting comprises an inlet passage 44, a valve seat 46, and an outlet passage 48 adapted to receive, support and guide a flat sided fuel inlet valve 50. The horizontal positioning of the fuel inlet fitting is particularly advantageous, as compared to one vertically positioned, in that the valve is supported by the fitting and consequently is not subjected to vertical forces of acceleration tending to unseat the valve. A level controlling float 52 is attached, as by soldering, to a float hanger 54 having extensions 56 bent as shown in Figure 3 to form bearings freely receiving a float fulcrum pin 58. The fulcrum pin is mounted in the float chamber side structure in any desired manner to form a pivotal support for the float hanger and attached float. The hanger is formed with a vertically projecting arm 60 having its upper end bent to form a lateral projection 62 to which is fastened a flat leaf spring 64 which engages the fuel inlet valve. The spring 64 is sufficiently wide to act also as a baffle preventing the incoming fuel from impinging against the float, such action having been found to increase the oscillations of the float.

The float hanger is preferably made of sheet brass, to facilitate soldering, of such thickness and ductility as to provide a hanger which will not deform under the forces of buoyancy and yet which may be readily bent for purpose of positioning the float to adjust the fuel level. The spring 64 is preferably made of spring bronze to facilitate soldering it to the hanger. It is readily apparent that the preferred thickness of the bronze spring will vary depending upon the effective length and width of the spring. Without intending to limit myself to these exact dimensions I have found that thicknesses of 3 to 10 thousandths of an inch are satisfactory for springs having a width of 7 sixteenths of an inch and an effective length of 5 sixteenths of an inch.

Placing the fuel inlet in the side wall of the chamber, and independent of the fuel chamber cover, permits checking of the fuel level with the cover removed. This is of particular advantage with carburetors having a yielding connection between the float and the fuel valve since such a connection introduces an additional variable which is not conducive to obtaining uniform fuel level settings in quantity production, within the permissible limits, without actually checking the fuel level at a fuel pressure corresponding to that present on the vehicle for which the carburetor is intended.

A vent 66 is provided in the float chamber cover portion 68 of the air horn section to vent the float chamber to atmosphere. A stop 70 is provided in the bottom of the float chamber to limit downward movement of the float.

The main fuel supply is delivered into the induction passage through the conventional metering jet 72 and discharge nozzle 74 and the idling fuel through idle tube 76, idle fuel passage 78, and idle discharge ports 80 and 82.

In operation, fuel is admitted to the float chamber through the inlet 44 from any source of fuel under pressure. As the fuel level in chamber 38 rises and approaches the desired level the float 52 will rise and cause the spring 64 to engage valve 50 and urge it against its seat. When the fuel level reaches the desired value the valve 50 is in closed position and the spring 64 is deflected. If the vehicle and consequently the carburetor are subjected to vertical accelerations the float may oscillate about its neutral position tending to exert more than sufficient force for closing the inlet valve during one half of the oscillation cycle and slightly less than the required force during the balance of the cycle, however, during the latter portion of the cycle the float continues to exert some force tending to close the valve. If the fuel level should tend to rise the spring deflection becomes greater, due to the increased buoyant force of the float, and as a consequence the valve is held against its seat during a greater percentage of the oscillation cycle thereby reducing the rate of fuel inflow. The fuel entering the float chamber during the valve-open part of the cycle is deflected by the baffle effect of spring 64 and is thereby prevented from impinging against the float. This periodic impingement of the fuel against the float in previous constructions is in synchronism with the float oscillation and consequently increases the severity of such oscillations. Although the fuel in the present structure impinges against the spring, which is attached to the float hanger, and consequently tends to increase the oscillations, the spring deflects the inflowing fuel away from the float and the resiliency of said spring absorbs a substantial portion of the impact of said fuel thereby substantially reducing the oscillations of the float.

Although but one embodiment of the invention is herein described it should not be presumed that the invention is limited thereto, nor otherwise, except in accordance with the subjoined claims.

I claim:

1. In a carburetor for an internal combustion engine, a fuel chamber having a fuel inlet, a valve in said inlet, a substantially non-resilient float hanger in the chamber, a pivotal mounting for said hanger, a float attached directly to the hanger, said hanger having a rigid arm, and a leaf spring attached to the arm adjacent the free end thereof, the free edge of said spring being adjacent the pivotal mounting of the hanger, and said valve being engaged by a portion of said spring adjacent said free edge of the latter.

2. The invention defined in claim 1, wherein the leaf spring is of sufficient size and so positioned as to deflect away from the float, the fuel entering the chamber from the inlet.

SAMUEL R. WILLITS.